US007020767B2

(12) United States Patent
Alverson et al.

(10) Patent No.: US 7,020,767 B2
(45) Date of Patent: Mar. 28, 2006

(54) TECHNIQUES FOR REDUCING THE RATE OF INSTRUCTION ISSUANCE

(75) Inventors: Gail A. Alverson, Seattle, WA (US); Charles David Callahan, II, Seattle, WA (US); Susan L. Coatney, Federal Way, WA (US); Laurence S. Kaplan, Seattle, WA (US); Richard D. Korry, Seattle, WA (US)

(73) Assignee: Cray Inc., Seattle, WA (US)

( * ) Notice: Subject to any disclaimer, the term of this patent is extended or adjusted under 35 U.S.C. 154(b) by 734 days.

(21) Appl. No.: 09/792,426

(22) Filed: Feb. 23, 2001

(65) Prior Publication Data

US 2002/0038332 A1    Mar. 28, 2002

Related U.S. Application Data

(62) Division of application No. 09/191,942, filed on Nov. 13, 1998, now Pat. No. 6,314,471.

(51) Int. Cl.
*G06F 9/44* (2006.01)
(52) U.S. Cl. ...................................... 712/227
(58) Field of Classification Search ............... 712/227, 712/107; 718/106, 107
See application file for complete search history.

(56) References Cited

U.S. PATENT DOCUMENTS

| 3,656,123 | A | * | 4/1972 | Carnevale et al. ........... 713/600 |
| 4,727,491 | A | * | 2/1988 | Culley ........................ 703/23 |
| 4,819,234 | A | | 4/1989 | Huber |
| 4,872,167 | A | | 10/1989 | Maezawa et al. |
| 5,125,088 | A | * | 6/1992 | Culley ........................ 713/400 |
| 5,168,554 | A | | 12/1992 | Luke |
| 5,301,325 | A | | 4/1994 | Benson |
| 5,333,280 | A | | 7/1994 | Ishikawa et al. |

(Continued)

FOREIGN PATENT DOCUMENTS

DE   19710252   2/1998

(Continued)

OTHER PUBLICATIONS

Motorola, MC68030 Enhanced 32-Bit Microprocessor User's Manual, Second Edition, 1989, pp. 2-9, 2-11, 2-17, 3-113, 11-2, 11-3, 11-19, 11-27, 11-29.*

(Continued)

*Primary Examiner*—Eddie Chan
*Assistant Examiner*—Aimee Li
(74) *Attorney, Agent, or Firm*—Perkins Coie LLP

(57) ABSTRACT

A method and system in a multithreaded processor for processing events without interrupt notifications. In one aspect of the present invention, an operating system creates a thread to execute on a stream of the processor. During execution of the thread, the thread executes a loop that determines whether an event has occurred and, in response to determining whether an event has occurred, assigns a different thread to process the event so that multiple events can be processed in parallel and so that interrupts are not needed to signal that the event has occurred. Another aspect of the present invention provides a method and system for processing asynchronously occurring events without interrupt notifications. To achieve this processing, a first thread is executed to generate a notification that the event has occurred upon receipt of the asynchronously occurring event. A second thread is also executed that loops determining whether a notification has been generated and, in response to determining that a notification has been generated, performing the processing necessary for the event.

49 Claims, 17 Drawing Sheets

U.S. PATENT DOCUMENTS

| | | | |
|---|---|---|---|
| 5,450,575 | A | 9/1995 | Sites |
| 5,504,932 | A | 4/1996 | Vassiliadis et al. |
| 5,533,192 | A | 7/1996 | Hawley et al. |
| 5,557,761 | A | 9/1996 | Chan |
| 5,564,051 | A | 10/1996 | Halliwell et al. |
| 5,581,764 | A | 12/1996 | Fitzgerald et al. |
| 5,594,864 | A | 1/1997 | Trauben |
| 5,598,560 | A | 1/1997 | Benson |
| 5,632,032 | A | 5/1997 | Ault et al. |
| 5,652,889 | A | 7/1997 | Sites |
| 5,712,996 | A | 1/1998 | Schepers |
| 5,754,855 | A | 5/1998 | Miller et al. |
| 5,768,591 | A | 6/1998 | Robinson |
| 5,768,592 | A | 6/1998 | Chang |
| 5,774,721 | A | 6/1998 | Robinson |
| 5,787,245 | A | 7/1998 | You et al. |
| 5,805,892 | A | 9/1998 | Nakajima |
| 5,812,811 | A | 9/1998 | Dubey et al. |
| 5,826,265 | A | 10/1998 | Van Huben et al. |
| 5,867,643 | A | 2/1999 | Sutton |
| 5,877,766 | A | 3/1999 | Bates et al. |
| 5,887,166 | A | 3/1999 | Mallick et al. |
| 5,901,315 | A | 5/1999 | Edwards et al. |
| 5,903,730 | A | 5/1999 | Asai et al. |
| 5,913,925 | A | 6/1999 | Kahle et al. |
| 5,933,627 | A * | 8/1999 | Parady ............... 712/228 |
| 5,953,530 | A | 9/1999 | Rishi et al. |
| 5,958,044 | A * | 9/1999 | Brown et al. ........... 712/219 |
| 5,961,639 | A | 10/1999 | Mallick et al. |
| 5,966,539 | A | 10/1999 | Srivastava |
| 5,978,902 | A | 11/1999 | Mann |
| 6,002,872 | A | 12/1999 | Alexander, III et al. |
| 6,002,879 | A | 12/1999 | Radigan et al. |
| 6,009,269 | A | 12/1999 | Burrows et al. |
| 6,029,005 | A | 2/2000 | Radigan |
| 6,049,671 | A | 4/2000 | Slivka et al. |
| 6,058,493 | A | 5/2000 | Talley |
| 6,059,840 | A | 5/2000 | Click, Jr. |
| 6,072,952 | A | 6/2000 | Janakiraman |
| 6,094,716 | A | 7/2000 | Witt |
| 6,101,524 | A | 8/2000 | Choi et al. |
| 6,112,293 | A | 8/2000 | Witt |
| 6,151,701 | A | 11/2000 | Humphreys et al. |
| 6,151,704 | A | 11/2000 | Radigan |
| 6,295,601 | B1 * | 9/2001 | Steele, Jr. ............... 712/244 |

FOREIGN PATENT DOCUMENTS

| | | |
|---|---|---|
| EP | 0422945 | 4/1991 |
| EP | 0455966 | 11/1991 |
| EP | 0537098 | 4/1993 |
| EP | 0855648 | 7/1998 |
| EP | 0864979 | 9/1998 |
| GB | 2307760 | 6/1997 |

OTHER PUBLICATIONS

*H. Hayashi et al., "ALPHA: A High Performance Lisp Machine Equipped with A New Stack Structure and Garbage Collection System," 10th Annual International Symposium on Computer Architecture, 1983.

*Roy F. Touzeau, "A Fortran Compiler for the FPS-164 Scientific Computer," Proceedings of the ACM Sigplan '84 Symposium on Compiler Construction, Sigplan Notices 19(6):48-57, Jun. 1984.

*A. Ram et al., "Parallel Garbage Collection Without Synchronization Overhead," 12th Annual Symposium on Computer Architecture, Jun. 17, 1985.

*Tomas Lang and Miquel Huguet, "Reduced Register Saving/Restoring in Single-Window Register Files," Computer Architecture News, vol. 14, No. 3, Jun. 1986.

*Preston Briggs et al., "Coloring Heuristics for Register Allocation," Department of Computer Science, Rice University, Houston, Texas, Jun. 1989.

*Jack W. Davidson and David B. Whally, Reducing the Cost of Branches by Using Registers, "Proceedings of the 17th Annual Symposium on Computer Architecture," Seattle, Washington, May 28-31, 1990.

*Burton Smith, "The End of Architecture," Keynote Address Presented at the 17th Annual Symposium on Computer Architecture, Seattle, Washington, May 29, 1990.

*Robert Alverson et al., "The Tera Computer System," Proceedings of 1990 ACM International Conference on Supercomputing, Jun. 1990.

*Mark A. Linton, "The Evolution of Dbx," USENIX Summer Conference, Jun. 11-15, 1990.

*David Callahan et al., "Improving Register Allocation for Subscripted Variables," Proceedings of the ACM SIGPLAN Conference on Programming Language Design and Implementation, White Plains, New York, Jun. 20-22, 1990.

*Fred C. Chow and John L. Hennessy, "The Priority-Based Coloring Approach to Register Allocation," ACM Transactions on Programming Languages and Systems, vol. 12, No. 4, Oct. 1990, pp. 501-536.

*David Callahan and Burton Smith, "A Future-Based Parallel Language for a General-Purpose Highly-Parallel Computer, Languages and Compliers for Parallel Computing," MIT Press, 1990.

*David Callahan and Brian Koblenz, "Register Allocation via Hierarchical Graph Coloring," Proceedings of the ACM SIGPLAN '91 Conference on Programming Language Design and Implementation, Toronto, Canada, Jun. 26, 28-1991.

*David Callahan, "Recognizing and Parallelizing Bounded Recurrences," Aug. 1991.

*D.H. Bailey et al., "The NAS Prallel Benchmarks—Summary and Preliminary Results," Numerical Aerodynamic Simulation (NAS) Systems Division, NASA Ames Research Center, California, 1991.

*Preston Briggs et al., "Coloring Register Pairs," ACM Letters on Programming Languages and Systems, vol. 1, No. 1, Mar. 1992, pp. 3-13.

*Priyadarshan Kolte and Mary Jean Harrold, "Load/Store Range Analysis for Global Register Allocation," ACM-SIGPLAN, Jun. 1993.

*"Method of Tracing Events in Multi-Threaded OS/2 Applications," IBM Tech. Disclosure Bulletin, Sep. 1993, pp. 19-22.

*Hiralal Agrawal, "Dominators, Super Blocks and Program Coverage," 21st ACM SIGPLAN-SIGACT Symposium on Principles of Programming Languages, Portland, Oregon, Jan. 17-21, 1994.

*Preston Briggs and Keith D. Cooper, "Effective Partial Redundancy Elimination," ACM SIGPLAN Notices, Association for Computing Machinery, New York, vol. 29, No. 6, Jun. 1, 1994.

*Smith, Burton, "Opportunities for Growth in High Performance Computing," Nov. 1994.

*Vugranam C. Sreedhar and Guang R. Gao, "Incremental Computation of Dominator Trees," ACM SIGPLAN Notices, Association for Computing Machinery, New York, vol. 30, No. 3, Mar. 1, 1995.

*Cliff Click, "Global Code Motion, Global Value Numbering," ACM SIGPLAN Notices, Association for Computing Machinery, New York, vol. 30, No. 6, Jun. 1, 1995.

*Jens Knoops et al., "The Power of Assignment Motion," ACM SIGPLAN '95 Conference on Programming Language Design and Implementation, La Jolla, California, June 18-21, 1995.

*Richard Korry et al., "Memory Management in the Tera MTA System," 1995.

*Major System Characteristics of the Tera MTA, 1995.

*Gail Alverson et al., "Scheduling on the Tera MTA," Job Scheduling Strategies for Parallel Processing, 1995.

*Gail Alverson et al., "Processor Management in the Tera MTA System," 1995.

*Gagan Agrawal and Joel Saltz, "Interprocedural Data Flow Based Optimizations for Compilation of Irregular Problems," Annual Workshop on languages and Compliers for Parallel Computing, 1995.

*George Lal and Andrew W. Appel, "Iterated Register Coalescing," ACM Transactions on Programming Languages and Systems, vol. 18, No. 3, May 1996, pp. 300-324.

*Kenneth J. Goldman, "Introduction to Data Structures," 1996 (retrieved from Internet, http://www.cs.wustl.edu{kjg/CS101_SP97/Notes?DataStructures/structures.html.

*Chaudhuri Surajit and Umeshwar Dayal, "An Overview of Data Warehousing and OLAP Technology," Sigmod Record, Association for Computing, New York, vol. 26, No. 1, Mar. 1997.

*Brad Adelberg et al., "The Strip Rule System for Efficiently Maintaining Derived Data," Sigmod Record, Association for Computing Machinery, New York, vol. 26, No. 2, Jun. 1, 1997.

*Tera MTA, Principles of Operation, Nov. 18, 1997.

Gail Alverson et al., "Tera Hardware-Software Cooperation," Proceedings of Supercomputing 1997, San Jose, California, Nov. 1997.

Jennifer Anderson et al., "Continuous Profiling: Where Have All the Cycles Gone?" Operating Systems Review, ACM Headquarters, New York vol. 31, No. 5, Dec. 1, 1997.

*Jim Galarowicz et al., "Analyzing Message Passing Programs on the Cray T3E with PAT and Vampir," Research Report, "Online!," May 1998.

*SangMin Shim and Soo-Mook Moon, "Split-Path Enhanced Pipeline Scheduling for Loops with Control Flows," IEEE, Dec. 2, 1998.

*Ji Minwen et al., "Performance Measurements for Multithreaded Programs," SIGMETRICS '98, ACM, 1998, pp. 168-170.

*Jonathan E. Cook and Alexander L. Wolf, "Event Based Detection of Concurrency," SIGSOFT '98 ACM, 1998, pp. 34-45.

*Jenn-Yuan Tsai et al., "Performance Study of a Concurrent Multithreaded Processor," IEEE, 1998, pp. 24-35.

*Burton Smith, "The Quest for General-Purpose Parallel Computing."

* cited by examiner

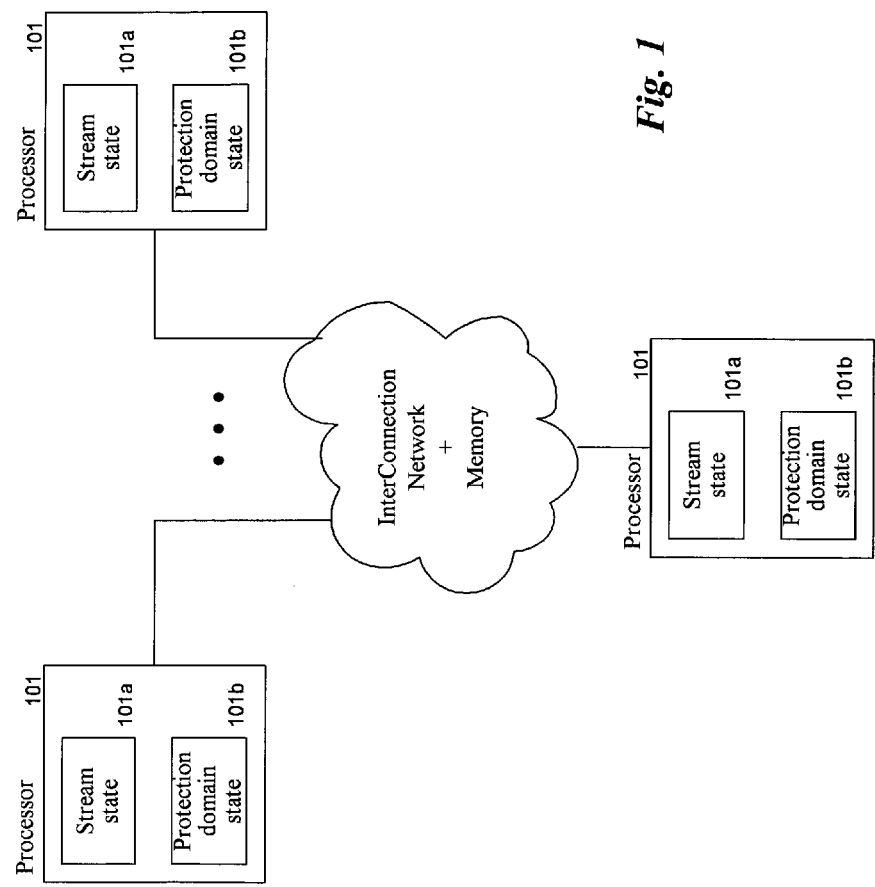

TECHNIQUES FOR REDUCING THE RATE OF INSTRUCTION ISSUANCE

CROSS REFERENCE TO RELATED APPLICATION

This application is a divisional of U.S. patent application Ser. No. 09/191,942, filed on Nov. 13, 1998 now U.S. Pat. No. 6,314,471.

TECHNICAL FIELD

The present invention relates to the processing of events by an operating system.

BACKGROUND OF THE INVENTION

Parallel computer architectures generally provide multiple processors that can each be executing different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer. Each processor 101 is connected to the interconnection network and memory 102. Each processor contains a complete set of registers 101a for each stream. In addition, each processor also supports multiple protection domains 101b so that multiple user programs can be executing simultaneously within that processor.

Each MTA processor can execute multiple threads of execution simultaneously. Each thread of execution executes on one of the 128 streams supported by an MTA processor. Every clock time period, the processor selects a stream that is ready to execute and allows it to issue its next instruction. Instruction interpretation is pipelined by the processor, the network, and the memory. Thus, a new instruction from a different stream may be issued in each time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0–R31"), and eight 32-bit Target Registers ("T0–T7"). Each MTA processor has 128 sets of SSWs, of general registers, and of target registers. Thus, the state of each stream is immediately accessible by the processor without the need to reload registers when an instruction of a stream is to be executed.

The MTA uses program addresses that are 32 bits long. The lower half of an SSW contains the program counter ("PC") for the stream. The upper half of the SSW contains various mode flags (e.g., floating point rounding, lookahead disable), a trap disable mask (e.g., data alignment and floating point overflow), and the four most recently generated condition codes. The 32 general registers are available for general-purpose computations. Register R0 is special, however, in that it always contains a 0. The loading of register R0 has no effect on its contents. The instruction set of the MTA processor uses the eight target registers as branch targets. However, most control transfer operations only use the low 32 bits to determine a new program counter. One target register (T0) points to the trap handler, which may be an unprivileged program. When a trap occurs, the trapping stream starts executing instructions at the program location indicated by register T0. Trap handling is lightweight and independent of the operating system and other streams. A user program can install trap handlers for each thread to achieve specific trap capabilities and priorities without loss of efficiency.

Each MTA processor supports as many as 16 active protection domains that define the program memory, data memory, and number of streams allocated to the computations using that processor. Each executing stream is assigned to a protection domain, but which domain (or which processor, for that matter) need not be known by the user program.

The MTA divides memory into program memory, which contains the instructions that form the program, and data memory, which contains the data of the program. The MTA uses a program mapping system and a data mapping system to map addresses used by the program to physical addresses in memory. The mapping systems use a program page map and a data segment map. The entries of the data segment map and program page map specify the location of the segment in physical memory along with the level of privilege needed to access the segment.

The number of streams available to a program is regulated by three quantities slim, scur, and sres associated with each protection domain. The current numbers of streams executing in the protection domain is indicated by scur; it is incremented when a stream is created and decremented when a stream quits. A create can only succeed when the incremented scur does not exceed sres, the number of streams reserved in the protection domain. The operations for creating, quitting, and reserving streams are unprivileged. Several streams can be reserved simultaneously. The stream limit slim is an operating system limit on the number of streams the protection domain can reserve.

When a stream executes a CREATE operation to create a new stream, the operation increments scur, initializes the SSW for the new stream based on the SSW of the creating stream and an offset in the CREATE operation, loads register (T0), and loads three registers of the new stream from general purpose registers of the creating stream. The MTA processor can then start executing the newly created stream. A QUIT operation terminates the stream that executes it and decrements both sres and scur. A QUIT_PRESERVE operation only decrements scur, which gives up a stream without surrendering its reservation.

The MTA supports four levels of privilege: user, supervisor, kernel, and IPL. The IPL level is the highest privilege level. All levels use the program page and data segment maps for address translation, and represent increasing levels of privilege. The data segment map entries define the minimum levels needed to read and write each segment, and the program page map entries define the exact level needed to execute from each page. Each stream in a protection domain may be executing at a different privileged level.

Two operations are provided to allow an executing stream to change its privilege level. A "LEVEL_ENTER lev" operation sets the current privilege level to the program page map level if the current level is equal to lev. The LEVEL_ENTER operation is located at every entry point that can accept a call from a different privilege level. A trap occurs if the current level is not equal to lev. The "LEVEL_RETURN lev" operation is used to return to the original privilege level. A trap occurs if lev is greater than the current privilege level.

An exception is an unexpected condition raised by an event that occurs in a user program, the operating system, or the hardware. These unexpected conditions include various floating point conditions (e.g., divide by zero), the execution of a privileged operation by a non-privileged stream, and the failure of a stream create operation. Each stream has an exception register. When an exception is detected, then a bit in the exception register corresponding to that exception is set. If a trap for that exception is enabled, then control is transferred to the trap handler whose address is stored in register T0. If the trap is currently disabled, then control is transferred to the trap handler when the trap is eventually enabled assuming that the bit is still set in the exception register. The operating system can execute an operation to raise a domain_signal exception in all streams of a protection domain. If the trap for the domain_signal is enabled, then each stream will transfer control to its trap handler.

Each memory location in an MTA computer has four access state bits in addition to a 64-bit value. These access state bits allow the hardware to implement several useful modifications to the usual semantics of memory reference. These access state bits are two data trap bits, one full/empty bit, and one forward bit. The two data trap bits allow for application-specific lightweight traps, the forward bit implements invisible indirect addressing, and the full/empty bit is used for lightweight synchronization. The behavior of these access state bits can be overridden by a corresponding set of bits in the pointer value used to access the memory. The two data trap bits in the access state are independent of each other and are available for use, for example, by a language implementer. If a trap bit is set in a memory location, then an exception will be raised whenever that location is accessed if the trap bit is not disabled in the pointer. If the corresponding trap bit in the pointer is not disabled, then a trap will occur.

The forward bit implements a kind of "invisible indirection." Unlike to normal indirection, forwarding is controlled by both the pointer and the location pointed to. If the forward bit is set in the memory location and forwarding is not disabled in the pointer, the value found in the location is interpreted as a pointer to the target of the memory reference rather than the target itself. Dereferencing continues until either the pointer found in the memory location disables forwarding or the addressed location has its forward bit cleared.

The full/empty bit supports synchronization behavior of memory references. The synchronization behavior can be controlled by the full/empty control bits of a pointer or of a load or store operation. The four values for the full/empty control bits are shown below.

| VALUE | MODE | LOAD | STORE |
|---|---|---|---|
| 0 | normal | read regardless | write regardless and set full |
| 1 | | reserved | reserved |
| 2 | future | wait for full and leave full | wait for full and leave full |
| 3 | sync | wait for full and set empty | wait for empty and set full |

When the access control mode (i.e., synchronization mode) is future, loads and stores wait for the full/empty bit of memory location to be accessed to be set to full before the memory location can be accessed. When the access control mode is sync, loads are treated as "consume" operations and stores are treated as "produce" operations. A load waits for the full/empty bit to be set to full and then sets the full/empty bit to empty as it reads, and a store waits for the full/empty bit to be set to empty and then sets the full/empty bit to full as it writes. A forwarded location (i.e., its forward bit is set) that is not disabled (i.e., by the access control of a pointer) and that is empty (i.e., full/empty bit is set to empty) is treated as "unavailable" until its full/empty bit is set to fill, irrespective of access control.

The full/empty bit may be used to implement arbitrary indivisible memory operations. The MTA also provides a single operation that supports extremely brief mutual exclusion during "integer add to memory." The FETCH_ADD operation loads the value from a memory location and stores the sum of that value and another value back into the memory location.

Each protection domain has a retry limit that specifies how many times a memory access can fail in testing full/empty bit before a data blocked exception is raised. If the trap for the data blocked exception is enabled, then a trap occurs. The trap handler can determine whether to continue to retry the memory access or to perform some other action. If the trap is not enabled, then the next instruction after the instruction that caused the data blocked exception is executed.

A speculative load occurs typically when a compiler generates code to issue a load operation for a data value before it is known whether the data value will actually be accessed by the program. The use of speculative loads helps reduce the memory latency that would result if the load operation was only issued when it was known for sure whether the program actually was going to access the data value. Because a load is speculative in the sense that the data value may not actually be accessed by the program, it is possible that a speculative load will load a data value that the program does not access. The following statements indicate program statement for which a compiler may generate a speculative load:

```
if i<N
x=buffer[i]
endif
```

The following statement illustrate the speculative load that is placed before the "if" statement.

```
r=buffer[i]
if i<N
x=r
endif
```

The compiler generated code to load the data value for buffer[i] into a general register "r" and placed it before the code generated for the "if" statement condition. The load of the data value could cause an exception. For example, if the index i was so large that an invalid memory location was being accessed. If the "if" statement condition is satisfied, then the exception would have eventually occurred, but at a later time. In addition, if the "if" statement condition is not satisfied, then no exception would occur. To prevent a speculative load from causing an exception to occur or occur too early, the MTA has a "poison" bit for each general register. Whenever a load occurs, the poison bit is set or cleared depending on whether an exception would have been raised. If the data in a general register is then used while the corresponding poison bit is set, then an exception is raised at the time of use. In the above example, the "r=buffer[i]" statement would not raise an exception, but would set the corresponding poison bit if the address is invalid. An exception, however, would be raised when the "x=r" statement is executed accessing that general register because its poison bit is set. The deferring of the exceptions and setting of the poison bits can be disabled by a speculative load flag in the SSW.

FIG. 2A illustrates the layout of the 64-bit exception register. The upper 32-bits contain the exception flags, and the lower 32 bits contain the poison bits. Bits 40–44 contain the flags for the user exceptions, which include a create stream exception, a privileged instruction exception, a data alignment exception, and a data blocked exception. A data blocked exception is raised when a data memory retry exception, a trap 0 exception, a trap 1 exception, or a long memory latency timeout is generated. The program handling a data blocked exception is responsible for determining the cause of the data blocked exception. The exception register contains one poison bit for each of the 32 general registers. If the poison bit is set, then an attempt to access the content of the corresponding register will raise an exception.

FIG. 2B illustrates the layout of the 64-bit stream status word. The lower 32 bits contain the program counter, bits 32–39 contain mode bits, bits 40–51 contain a trap mask, and bits 52–63 contain the condition codes of the last four instructions executed. Bit 37 within the mode bits indicates whether speculative loads are enabled or disabled. Bit 48 within the trap mask indicates whether a trap on a user exception is enabled (bits 40–44 of the SSW). Thus, traps for the user exceptions are enabled or disabled as a group.

FIG. 2C illustrates the layout of a word of memory and in particular a pointer stored in a word of memory. Each word of memory contains a 64-bit value and a 4-bit access state. The 4-bit access state is described above. When the 64-bit value is used to point to a location in memory, it is referred to a "pointer." The lower 48 bits of the pointer contains the address of the memory location to be accessed, and the upper 16 bits of the pointer contain access control bits. The access control bits indicate how to process the access state bits of the addressed memory location. One forward disable bit indicates whether forwarding is disabled, two full/empty control bits indicate the synchronization mode; and four trap 0 and 1 disable bits indicate whether traps are disabled for stores and loads, separately. If the forward disable bit is set, then no forwarding occurs regardless of the setting of the forward enable bit in the access state of the addressed memory location. If the trap 1 store disable bit is set, then a trap will not occur on a store operation, regardless of the setting of the trap 1 enable bit of the access state of the addressed memory location. The trap 1 load disable, trap 0 store disable, and trap 0 load disable bits operate in an analogous manner. Certain operations include a 5-bit access control operation field that supersedes the access control field of a pointer. The 5-bit access control field of an operation includes a forward disable bit, two full/empty control bits, a trap 1 disable bit, and a trap 0 disable bit. The bits effect the same behavior as described for the access control pointer field, except that each trap disable bit disables or enables traps on any access and does not distinguish load operations from store operations.

When a memory operation fails (e.g., synchronized access failure), an MTA processor saves the state of the operation. A trap handler can access that state. That memory operation can be redone by executing a redo operation (i.e., DATA_OP_REDO) passing the saved state as parameters of the operation. After the memory operation is redone (assuming it does not fail again), the trapping stream can continue its execution at the instruction after the trapping instruction.

An MTA computer system may include I/O processors to control the input/output to and from external sources. These I/O processors execute IOP instructions that control the transferring out of data from memory to the external sources and the transferring in of data from the external sources to memory. These external sources may include a network, a disk drive, and a keyboard. FIG. 3 is a block diagram illustrating an I/O processor. An I/O processor 301 supports the simultaneous execution of four instruction streams: a load stream 302, an out stream 303, a store stream 304, and an in stream 305. The I/O processor also includes an out buffer 306 and an in buffer 307. Control word 308 contains a pointer to an instruction segment 309. The instruction segment contains the IOP instructions that are to be executed by the streams. The load stream and the store stream move data between memory 310 and the buffers. The out stream and the in stream move data between the buffers and the external sources, such as a redundant array of inexpensive disks 311. When the computer is booted, the boot routine may load the control word with a pointer to the instruction segment. Device drivers interact with the streams to effect the input and output of data.

FIG. 4 illustrates the format of an instruction segment. The instruction segment contains two words for each of the four streams. One word is a status word (xx_status$) and the other word is a next program counter (xx_next_pc$) that points to the next instruction to be executed by the stream. Each stream fetches and executes instructions in a linear fashion. If an exceptional event occurs during the execution of instruction, the stream performs a "link operation"0 with the device driver to inform it of the exception. The link operation is defined as a write to the stream status word, followed by a read from the program counter. The device driver and the stream access the status word and the program counter using a synchronization mode of sync. In general, a device driver waits until the status word is written by the stream indicating that a stream event has occurred, and a stream then waits until the next program counter is written by the device driver indicating its next instructions to execute.

Conventional computer architectures support the concept of an interrupt. An interrupt occurs in response to an event occurring within the computer system or external to the computer system. Events occurring within the computer system that may cause an interrupt include a page fault, division by zero, an unauthorized attempt to execute a privileged instruction, or at timer expiration. Events occurring external to the computer system that may cause an interrupt include receipt of a packet of network data or keyboard entry of data. When such an event occurs, the processor saves the program counter of the currently executing program and starts executing instructions at a designated location. That designated location is the entry point of an interrupt handling routine. The interrupt handling routine performs the processing necessary to respond to that event. When the interrupt handling routine completes its processing, it restores the saved program counter so that the interrupted program can resume execution. In contrast to these conventional computer architectures, the MTA does not support such interrupts. However, these external events still need to be processed in a timely manner.

Operating systems for conventional computer systems use interrupts to control the overall execution of the operating system and the user programs. The operating systems, in response to an interrupt resulting from a time period expiration, may swap out the currently executing user program and swap in another user program. Also, the operating systems in response to an interrupt resulting from user input, may either immediately swap in the user program waiting for the input or, alternatively, set a flag so that the operating system may swap in the user program during the next timer expiration interrupt processing.

The appendix contains the "Principles of Operation" of the MTA, which provides a more detailed description of the MTA.

SUMMARY OF THE INVENTION

Embodiments of the present invention provide a method and system in a multithreaded processor for processing events without interrupt notifications. In one aspect of the present invention, an operating system creates a thread to execute on a stream of the processor. During execution of the thread, the thread executes a loop that determines whether an event has occurred and, in response to determining whether an event has occurred, assigns a different thread to process the event so that multiple events can be processed in parallel and so that interrupts are not needed to signal that the event has occurred. The events may include a timer expiration or the unblocking of a thread that now can be assigned to a stream for execution.

Another aspect of the present invention provides a method and system for processing asynchronously occurring events without interrupt notifications. To achieve this processing, a first thread (e.g., device driver) is executed to generate a notification that the event has occurred upon receipt of the asynchronously occurring event. A second thread is also executed that loops determining whether a notification has been generated and, in response to determining that a notification has been generated, performing the processing necessary for the event. If multiple second threads are created then various asynchronous events can be processed in parallel.

BRIEF DESCRIPTION OF THE DRAWINGS

FIG. 1 provides a high-level overview of an MTA computer. Each processor 101 is connected to the interconnection network and memory 102.

DETAILED DESCRIPTION OF THE INVENTION

Figure 2A:
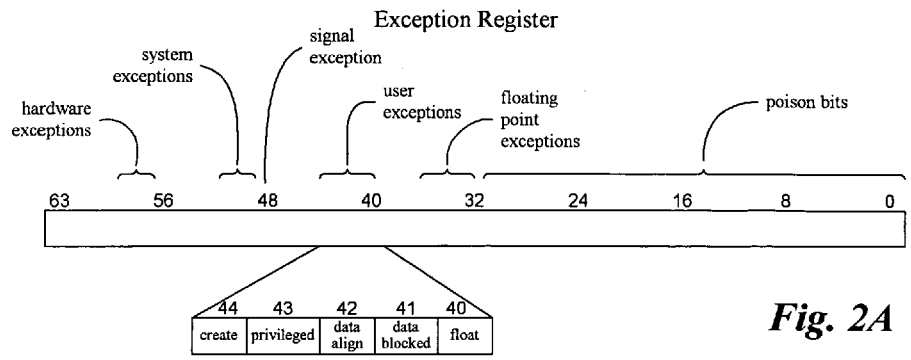
FIG. 2A illustrates the layout of the 64-bit exception register.
Figure 2B:
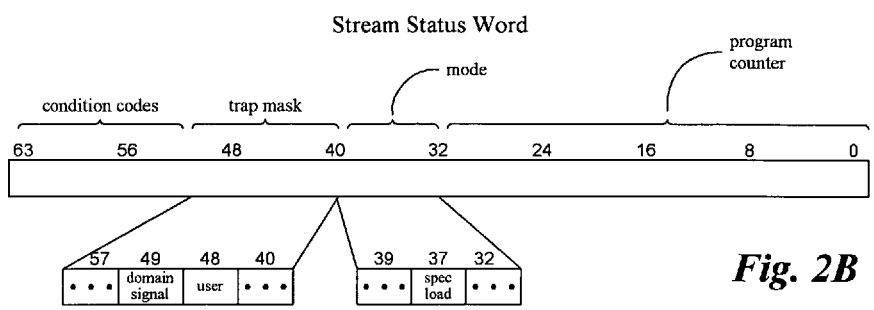
FIG. 2B illustrates the layout of the 64-bit stream status word.
Figure 2C:
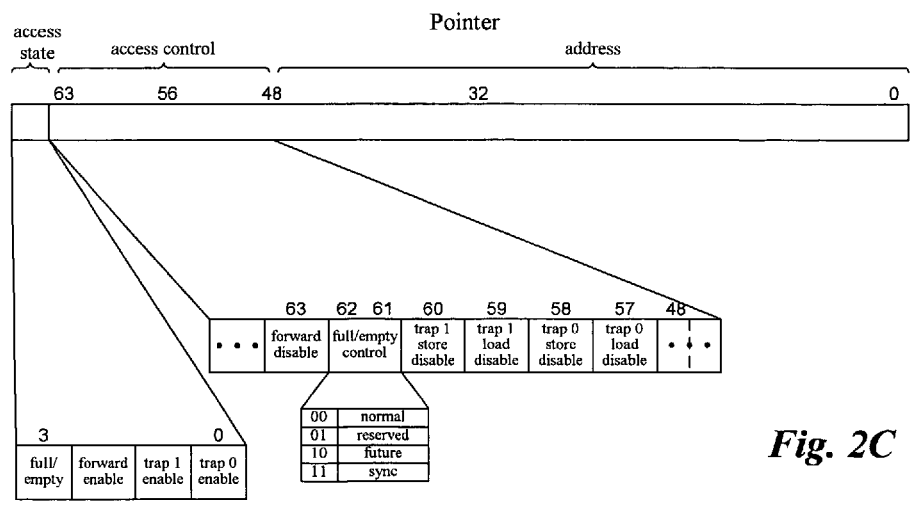
FIG. 2C illustrates the layout of a word of memory and in particular a pointer stored in a word of memory.
Figure 3:
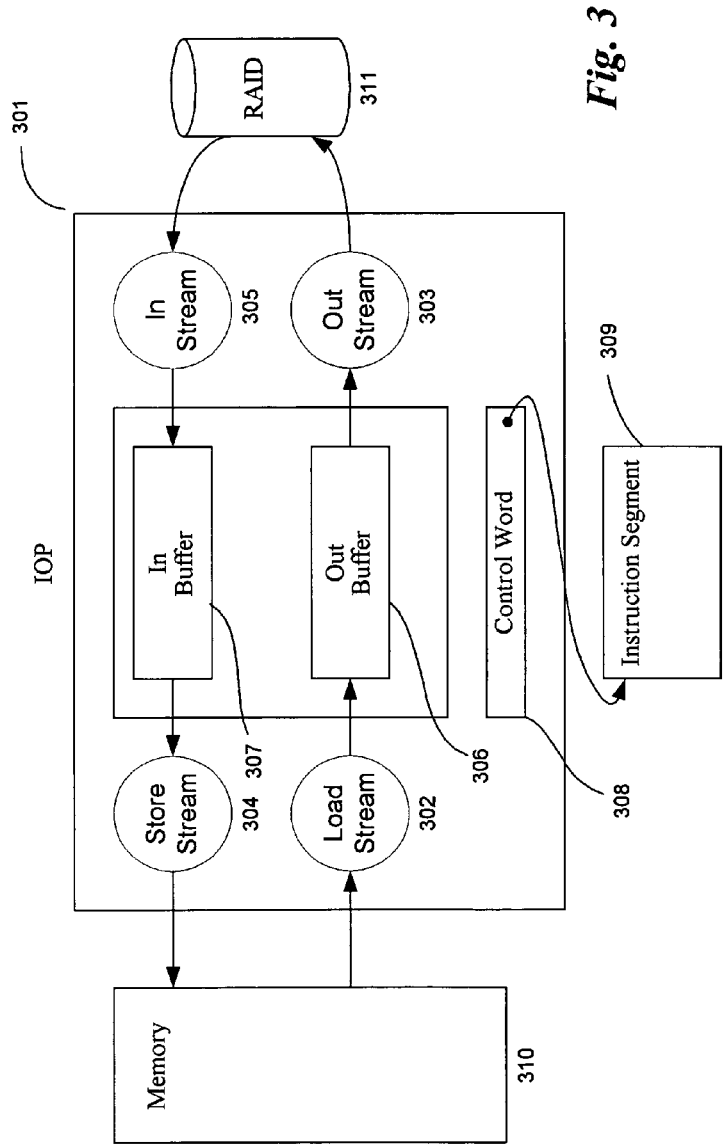
FIG. 3 is a block diagram illustrating an I/O processor.
Figure 4:
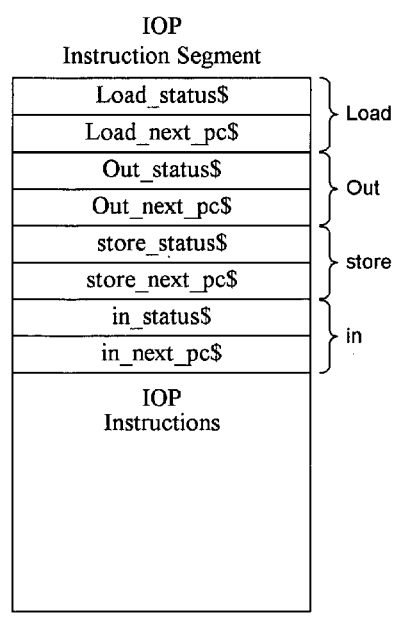
FIG. 4 illustrates the format of an instruction segment.

Embodiments of the present invention provide techniques for operating system processing on a computer system that supports limited or no interrupts. The operating system of the present invention controls its overall execution and the execution of user programs without relying on interrupts. The operating system of the present invention uses various special-purpose threads, referred to as "daemons," to perform operating system activities in parallel on behalf of the operating system. The daemons of the operating system include a virtual processor daemons ("VP daemons"), kernel daemons, supervisor daemons, and a listener daemon. The operating system uses the VP daemons to perform work (e.g., invoke a function) on behalf of the operating system. The VP daemons loop awaiting for work to be queued up by the operating system and when the work is queued, a VP daemon performs the work on behalf of the operating system. The unit of work that is queued is referred to as a "continuation," and the queue is referred to as a "continuation queue." In one embodiment, the VP daemons do not block. Rather, if a VP daemon executes a continuation that becomes blocked (e.g., waiting for a synchronized read), then rather than blocking itself the VP daemon places the blocked continuation in a blocked continuation queue and starts execution of another continuation from the continuation queue. Eventually, when the blocked continuation becomes unblocked either that VP daemon or another will continue with the execution of the continuation that is now unblocked. In an interrupt-based operating system, such units of work would typically be performed by an interrupt routine. Therefore, the use of VP daemons allows the units of work to be performed in an interrupt-free environment and in parallel.

The operating system creates kernel daemons and supervisor daemons to perform various activities in parallel. For example, the operating system may create a kernel daemon to schedule tasks and may create a supervisor daemon to execute a device driver. Eventually, a kernel daemon or a supervisor daemon may become blocked (e.g., waiting for an event). In an interrupt-based environment, the occurrence of the event may generate an interrupt, and the interrupt routine could then start the execution of the now unblocked daemon. Similarly, a thread of a user program may become blocked (e.g., waiting for a response to a read request). In an interrupt-based environment, an interrupt routine invoked when the read request is satisfied could start the execution of the user thread that was blocked. However, in an interrupt-free environment, the restarting of the daemons and the user threads cannot be performed by an interrupt routine.

One embodiment of the present invention uses a listener daemon to effect this restarting in an interrupt-free environment. More generally, the listener daemon loops checking for occurrences of events that would normally generate an interrupt in an interrupt-based environment. When the occurrence of an event is detected, the listener daemon can then perform processing similar to that performed in response to the interrupts of conventional computer systems, such as restarting an unblocked kernel daemon, supervisor daemon, or user thread. For example, the listener daemon may loop checking to see if a thread that has been blocked waiting for keyboard input has become unblocked, because the keyboard input has been received. The listener daemon can then assign the unblocked thread to a stream for execution. As the listener daemon loops, it also checks a timer queue to determine if any thread has requested that a certain unit of work be performed at a certain time. If so, the listener daemon sends a message to a timeout daemon that receives the message and starts a supervisor daemon to perform the work. In this way, the timer expiration interrupts of conventional computers can be simulated.

The operating system in one embodiment also provides for the processing data asynchronously received from an external source both in parallel and without interrupts. The device driver for processing the received data maintains a list of callback routines to be invoked when each type of asynchronous event occurs (e.g., data received for a certain task). When that event occurs, the device driver invokes the appropriate callback routine for that event. The callback routine places on the continuation queue a request for a unit of work to be performed to handle the asynchronous event. A VP daemon eventually removes the request from the continuation queue and starts performing that unit of work. Depending on the frequency in which data is received asynchronously, several VP daemons may be simultaneously executing units of work that are processing the asynchronously received data. This simultaneous execution effects the parallel processing of data received asynchronously and without interrupts.

Figure 5:
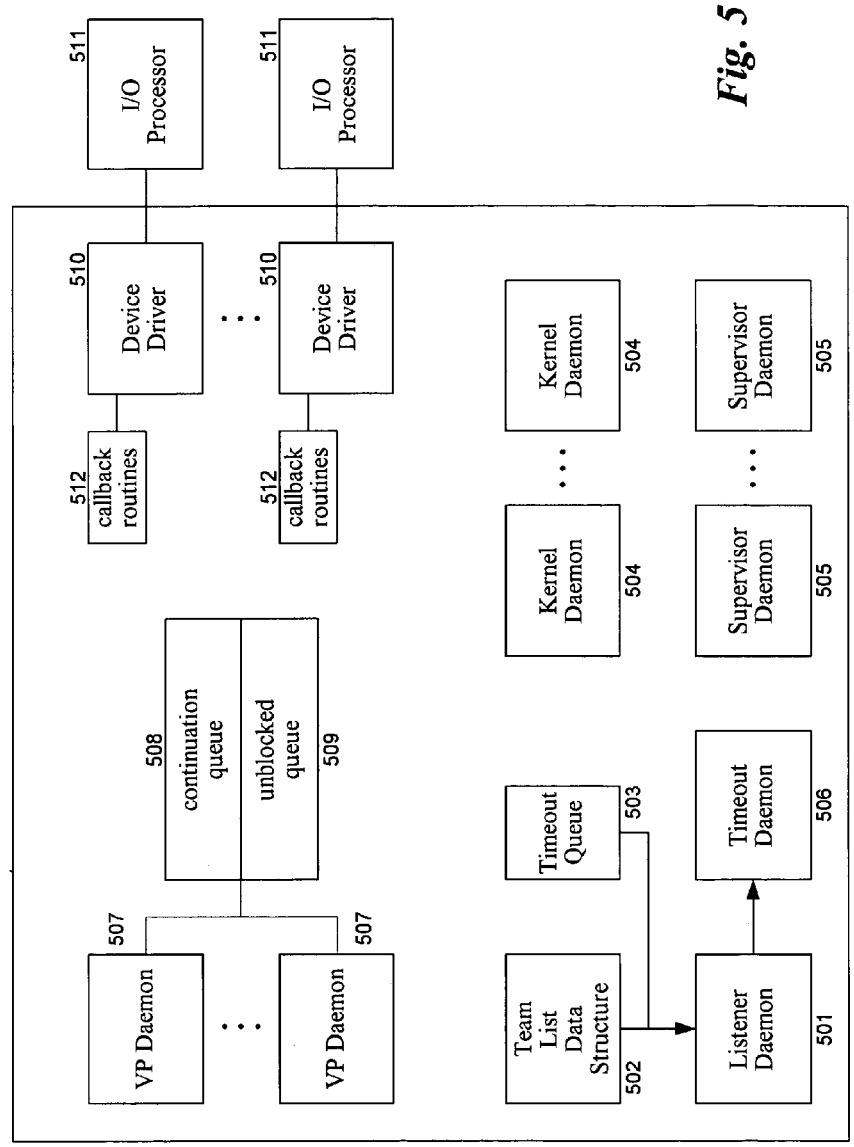
FIG. 5 is a blocked diagram illustrating components of an operating system executing on a multithreaded processor.

FIG. 5 is a blocked diagram illustrating components of an operating system executing on a multithreaded processor. The same components may be executing simultaneously on other processors in a multiprocessor environment. The operating system includes various daemons and data structures. The listener daemon 501 loops checking the team list data structure 502 for kernel daemons 504, supervisor daemons 505, and user threads that are now unblocked and need to be restarted. The listener daemon also checks the timeout queue 503 to determine whether any timers have expired. If a timer has expired, the listener daemon sends a message to the timeout daemon 506. The timeout daemon creates a supervisor daemon to perform the work to respond to the timer expiration. The VP daemons 507 loops checking the continuation queue 508 and the unblocked continuation queue 509. The unblocked continuation queues hold those continuations that have been started, but became blocked and are now unblocked. When a queue is not empty, a VP daemon starts executing or restarts executing the unit of work indicated on the queue. The device drivers 510 interface with the I/O processors 511. When a device driver receives an indication of an event from an I/O processor, the device driver invokes a callback routine 512 for processing that event. The callback routine may generate a request for unit of work to be performed and place that request on the continuation queue.

Listener Daemon

Figure 6:
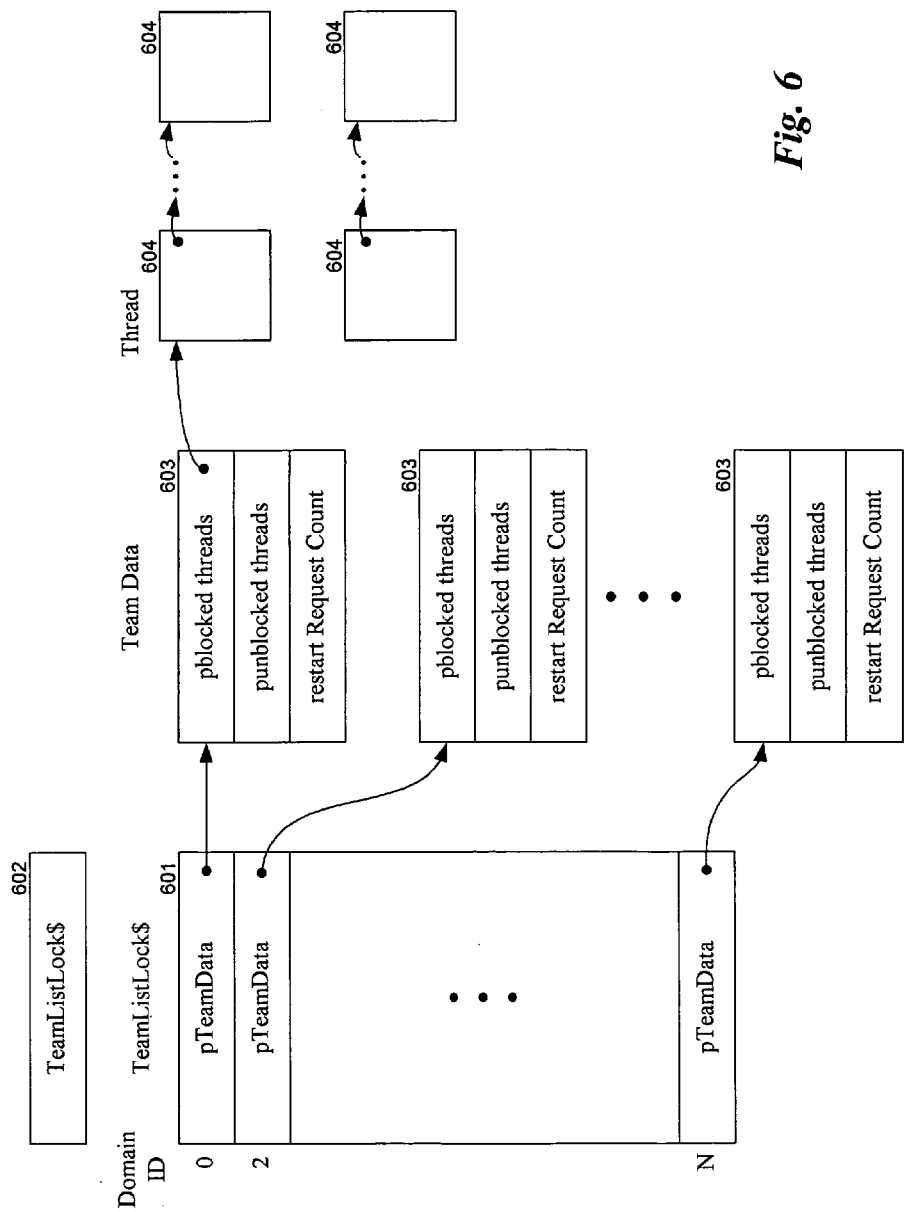
FIG. 6 is the block diagram illustrating the team list data structure.

The listener daemon of a processor has access to a team list data structure that contains an entry for each domain. Each task (i.e., an executing user program) may have threads executing on different processors simultaneously. The collection of threads of a task executing on the same processor are referred to as a "team." Each entry points to a team data structure that contains information relating to the team executing within that domain. The operating system executes in one of the domains and the corresponding entry points to a data structure for the operating system that may contain information relating to the kernel and supervisor daemons. FIG. 6 is the block diagram illustrating the team list data structure. Access to the team list data structure 601 is controlled by the TeamListLock$ synchronization variable 602. The team list data structure entries point to the team data structure for the team currently executing in that domain. If no team is currently executing in that domain, then the entry is null. The team data structures 603 contain a pointer (pblockedthreads) to a linked list of thread data structures 604 of threads of the team that are currently blocked. The team data structure also contains a pointer (punblockedthreads) to a linked list of thread data structures of threads of the team that are currently unblocked and waiting to be assigned to a stream for execution. The team data structure also contains a restartRequestCount variable that indicates that number of unblocked threads on the linked list.

Figure 7:
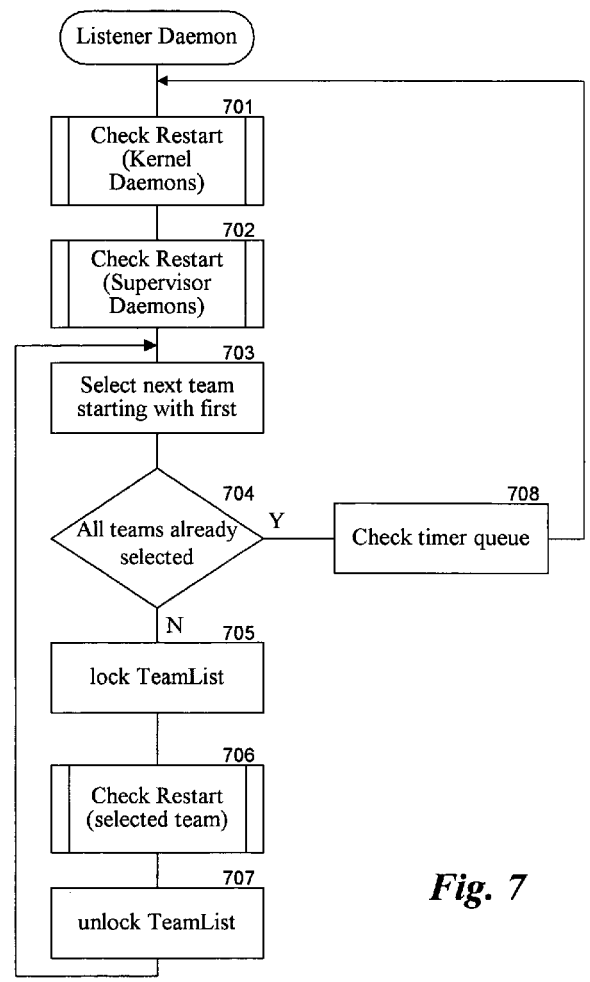
FIG. 7 is a flow diagram of an example listener daemon.

FIG. 7 is a flow diagram of an example listener daemon. The listener daemon loops determining whether any kernel daemons, supervisor daemons, or user threads have been unblocked by an external event and are ready to continue execution. If so, the listener daemon restarts those daemons and threads. The listener daemon also checks the timeout queue to determine whether any timers have expired. In step 701, the listener daemon invokes the checkrestart routine passing a pointer to a "team" data structure for the kernel daemons. The checkRestart routine determines whether to start the execution of any unblocked threads. In step 702, the listener daemon invokes the checkRestart function passing a pointer to a "team" data structure for the supervisor daemons. In steps 703–707, the listener daemon loops checking whether each team that is currently executing in a protection domain has any unblocked threads that need to be restarted. In step 703, the listener daemon selects the next team starting with the first. In step 704, if all the teams have already been selected, then the listener daemon continues at step 708, else the listener daemon continues at step 705. In step 705, the listener daemon locks the team list using the TeamListLock$ synchronization variable. In step 706, the listener daemon invokes the checkrestart function passing a pointer to the team data structure of the selected team. In step 707, the listener daemon unlocks the team list data structures by writing to the TearnListLock$ synchronization variable and loops to step 703 to select the next team. In step 708, the listener daemon checks the timeout queue to determine if any timers have expired. If so, the listener daemon sends a message to the timeout daemon to process the timer expiration. The timeout daemon then creates a daemon to process each timer expiration. In one embodiment, the timeout queue is sorted by expiration time and contains an indicate of the unit of work (e.g., function) to be performed to process the timeout.

Figure 8:
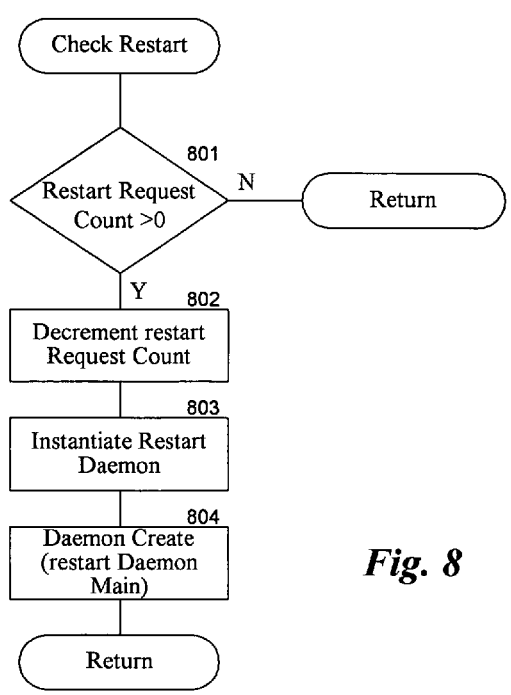
FIG. 8 is a flow diagram of an example checkrestart function.

FIG. 8 is a flow diagram of an example checkrestart function. This function is passed a pointer to a team data structure that may need to have a thread restarted. In step 801, if the restartRequestCount of the passed team data structure is greater than zero, then the function continues that step 802, else the function returns because there are no unblocked threads. In step 802, the function decrements the restartRequestCount variable. In step 803, the function instantiates a data structure for a restart daemon. The restart daemon will be executed in a different stream and start execution of the unblocked thread. In step 805, the routine invokes a function to create the daemon passing indication of a restartDaemonMain function to indicate where the daemon should start its execution. The function returns.

Figure 9:
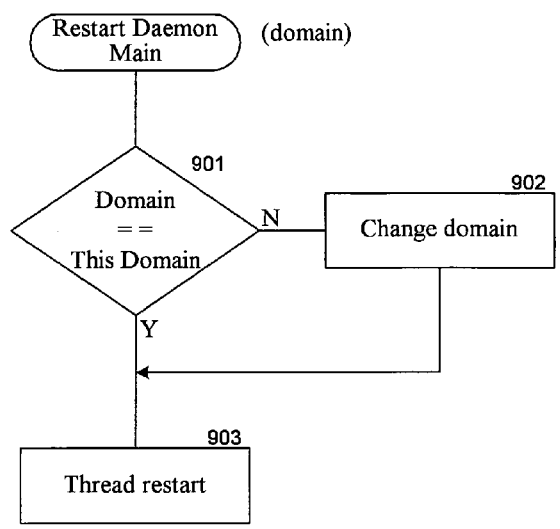
FIG. 9 is a flow diagram of an example restartDaemonMain function.

FIG. 9 is a flow diagram of an example restartDaemonMain function. This function is passed an indication of the domain in which the thread is to be re-started. User threads are started in the domain of the user program. In step 901, if the passed domain is equal to the current domain, then the function continues at step 903, else the function changes the domain in step 902. In step 903, the function restarts the thread by invoking a routine previously registered with the operating system by the "team" to handle unblocked threads.

VP Daemon

Figure 10:
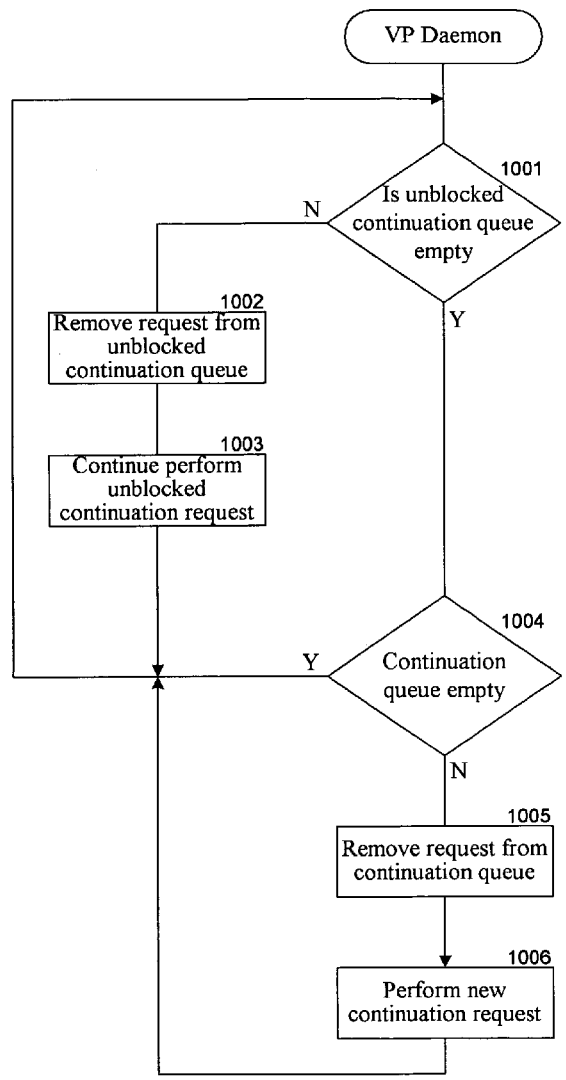
FIG. 10 is a flow diagram of an example VP daemon.

FIG. 10 is a flow diagram of an example VP daemon. The VP daemon loops checking whether any continuations that were previously blocked are now unblocked and whether any new continuations are ready to be executed. If so, the VP daemon either continues with the execution of the continuation or starts the execution of the new continuation. A VP daemon may also determine that additional VP daemons are needed to help servicing the continuation queue and unblocked continuation queue. If so, the VP daemon can create a new VP daemon. Conversely, if a VP daemon determines that too many VP daemons are currently executing, the VP daemon can quit. One skilled art would appreciate that various algorithms can be used to create and quit VP daemons. In step 1001, if the unblocked queue is empty, then the VP daemon continues at step 1004, else that the VP daemon continues step 1002. The restarting of unblocked continuations is given priority over the starting of new continuations. In step 1002, the daemon removes the continuation request from the unblocked continuation queue. In step 1003, the VP daemon continues with performing the unblocked continuation. When the work of the continuation is complete or the continuation again blocks, the VP daemon loops to step 1001 to again check the queues. In step 1004, if the continuation queue is empty, then VP daemon loops to step 1001 to again check the queues, else the VP daemon continues that step 1005. In step 1005, the VP daemon removes a continuation request from the continuation queue. In step 1006, the VP daemon performs the new continuation request. When the work of the new continuation request is complete or the continuation blocks, the VP daemon loops to step 1001 to again check the queue.

I/O processing

One aspect of the present invention provides for the parallel processing of asynchronously received events. In the following example of this parallel processing, data is received asynchronously from an external source. The load stream for the I/O processor through which the data is received, notifies a device driver using a synchronization variable that the data has been received. The device driver then determines which callback routine has been designated by the operating system to handle that data and invokes that callback routine. The callback routine then places a continuation request on the continuation queue, which is eventually processed by a VP daemon. Because multiple VP daemons can be executing simultaneously, multiple VP daemons can be processing different occurrences of asynchronously received data simultaneously. In the following, the processing of a load stream and load device driver are described to illustrate the processing when a request to read data is sent to an external source. Then the processing of the store stream and store device driver are described to illustrate the processing of the asynchronously received data.

Figure 11:
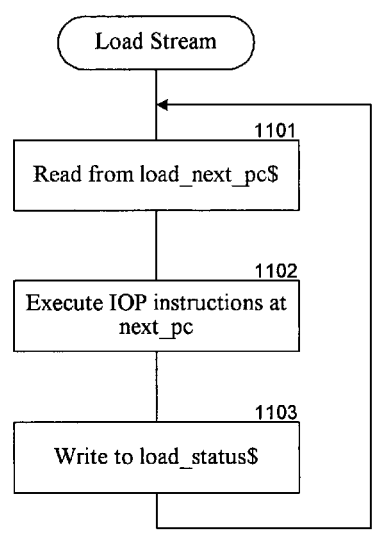
FIG. 11 is a flow diagram that illustrates the processing of an example load stream.

FIG. 11 is a flow diagram that illustrates the processing of an example load stream. As discussed in the background, the load stream retrieves data from memory and stores the retrieved data in the out buffer for outputting to an external source. The load stream coordinates the transferring out of data with the device driver using the load_status$ and load_next_pc$ synchronization variables of the instruction buffer. In step 1101, the load stream reads from the load_next_pc$ synchronization variable. The corresponding device driver for the load stream writes the program counter for the next instruction that the load stream is to execute. The load stream waits until the synchronization variable is written. In step 1102, the load stream executes the IOP instructions pointed to by the program counter. In step 1103, the load stream writes to the load_status$ synchronization variable. The writing to this synchronization variable notifies the corresponding device driver that an event occurred that may need to be processed by the device driver. The load stream then loops to step 1101 to wait until the device driver notifies the load stream which instructions to execute next.

Figure 12:
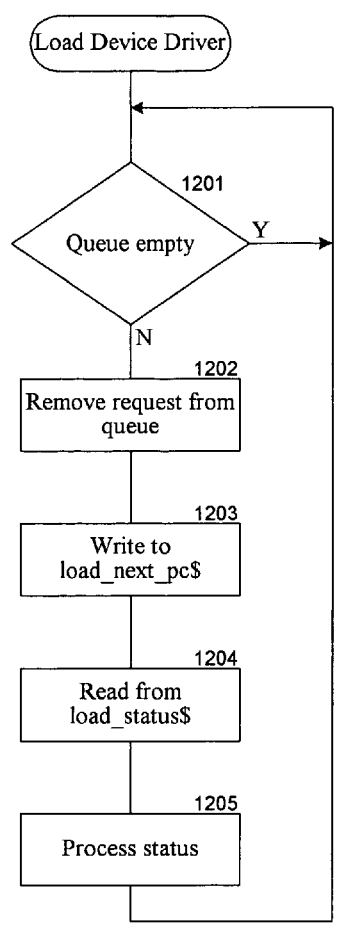
FIG. 12 is a flow diagram that illustrates the processing of an example load device driver.

FIG. 12 is a flow diagram that illustrates the processing of an example load device driver. When an application program invokes an operating system call to request a read from an external source, the operating system places the request on a queue for the load device driver. The load device driver loops checking that queue and processing the requests. In step 1201, if the queue is empty, the device driver loops until a request is placed in the queue. When a request is placed in the queue, the device driver continues at step 1202. In step 1202, the device driver removes a request from the queue. In step 1203, the device driver writes the program counter for the load stream to the load_next_pc$ synchronization variable, which directs the load stream to start processing that request. In step 1204, the load device driver reads from the load_status$ synchronization variable which waits until the load stream completes the request. In step 1205, the load device driver processes the read status and then loops to step 1201 to remove the next request from the queue. The load driver may be optimized to construct an IOP program to process multiple requests and to overlap the construction of the IOP program with the IOP output processing.

Figure 13:
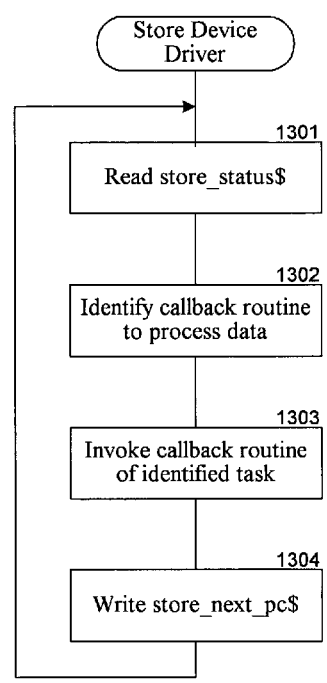
FIG. 13 is a flow diagram illustrating the processing of an example store device driver.

FIG. 13 is a flow diagram illustrating the processing of an example store device driver. The store device driver may receive data from the store stream that was in response to a read request (e.g., a network packet). The store device driver maintains a list of callback routines that are to be invoked to process the received data. These callback routines may place a continuation on the continuation queue. A VP daemon eventually performs that unit of work specified by the continuation. In step 1301, the store device driver reads the store_status$ synchronization variable, which waits until the store stream receives information. In step 1302, the store device driver identifies the callback routine to process the data. In step 1303, the store device driver invokes the identified callback routine. In step 1304, the store device driver writes a program counter to the store_next_pc$ synchronization variable and loops to step 1301 to wait for the next notification from the store stream.

Figure 14:
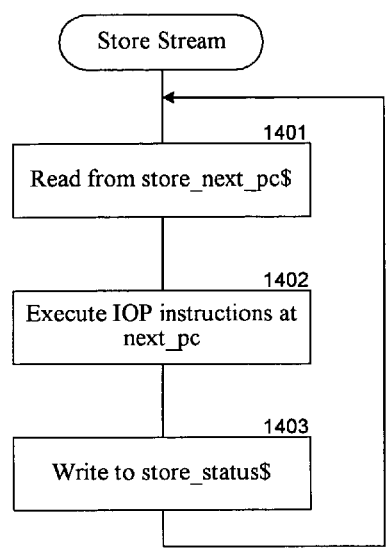
FIG. 14 illustrates the processing of the store stream.

FIG. 14 illustrates the processing of the store stream. In step 1401, the store stream reads from the store_next_pc$ synchronization variable. In step 1402, the store stream executes the IOP instructions at the indicated program counter. These instructions may indicate to wait until data is received and then store that data in memory. In step 1403, the store stream writes a status to the store_status$ synchronization variable to notify the store device driver that data has been received. The store stream then loops to step 1401 to wait for the setting of its program counter.

Figure 15:
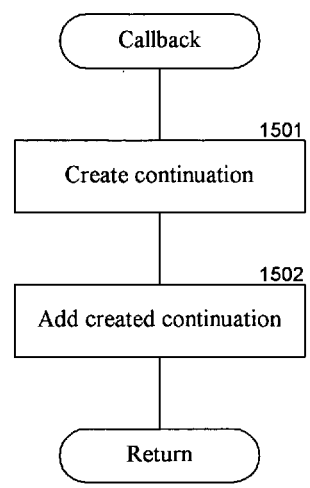
FIG. 15 is a flow diagram illustrating a callback routine.

FIG. 15 is a flow diagram illustrating a callback routine. In step 1501, the callback routine creates a continuation. In step 1502, the callback routine adds the created continuation to the continuation queue to be scheduled for execution by a VP daemon. The callback routine then returns.

Reducing Instruction Issues

Figure 16:
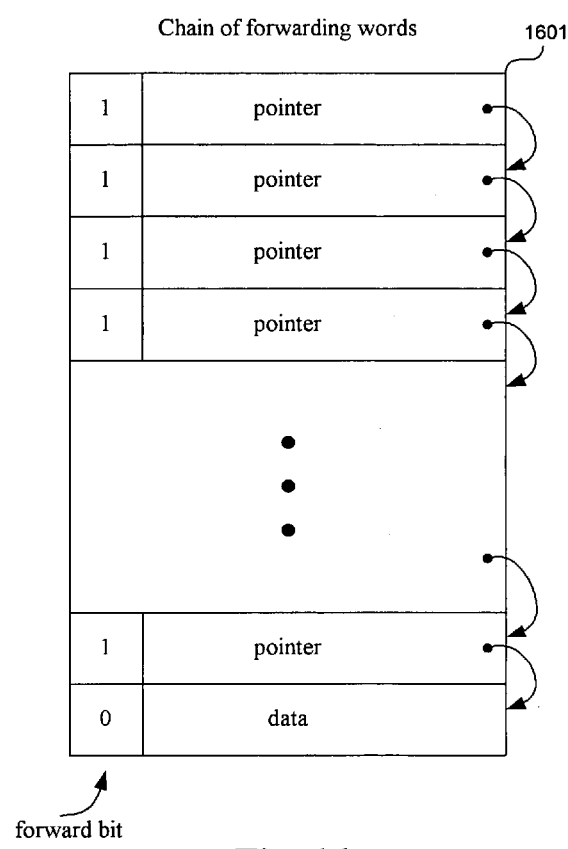
FIG. 16 illustrates a technique for reducing the number of issued instructions while in such a loop.

When daemons such as the listener daemon, VP daemons, or timeout daemon are executing, they can consume considerable processor resources in their loop checking on whether work needs to be performed. More generally, many computer programs execute loops checking for a certain event or condition to occur. Such looping may be wasteful of processor resources when the events or conditions do not occur frequently relative to the time it takes to process the event or condition. Thus, considerable processor resources may be spent looping until the next event or condition occurs. In a conventional interrupt-based environment, a looping program can block for a certain period of time waiting for a timer interrupt. The program can then check for the event or condition. Alternatively, the program may not need to loop and can instead wait for an interrupt signaling the occurrence of the event or condition. To reduce the overhead of such looping in an interrupt-free environment, various techniques can be used to reduce the number of instructions issued while waiting for the event or condition to occur. FIG. 16 illustrates a technique for reducing the number of issued instructions while in such a loop. Prior to checking to determine whether the event or condition has occurred, the looping routine executes an instruction to access a memory location through a chain of forwarding words 1601. Each of the forwarding words have their forward bits set and contain a pointer to another of the forwarding words, except for the last word in the chain. The last word in the chain does not have its forward bit set. When the looping routine executes an instruction to access the word through this chain of forwarding words, the memory subsystem will spend an amount of time linearly related to be number of forwarding words in the chain in accessing the data. The stream executing the looping routine will not issue additional instructions until the forwarding is resolved by the memory subsystem. Thus, the rate in which the looping routine issues instructions will be reduced when the length of the chain increased. Other streams will thus be allowed to issue instructions at a faster rate because of the fewer instructions being issued by the stream executing the looping routine.

Figure 17:
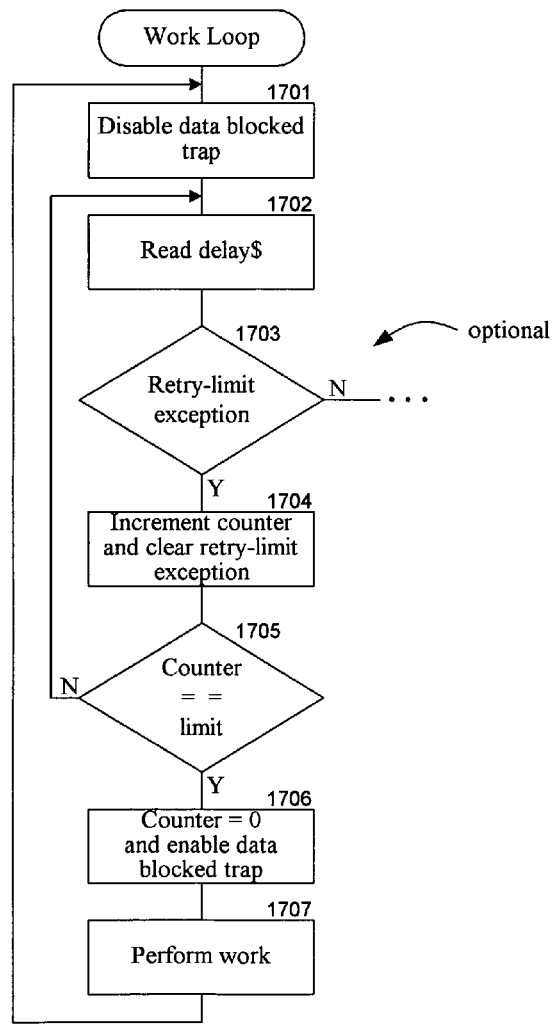
FIG. 17 is a flow diagram illustrating another technique for reducing the number of instructions executed by a looping routine.

FIG. 17 is a flow diagram illustrating another technique for reducing the number of instructions executed by a looping routine. This technique utilizes the delay in issuing an instruction that results from accessing a word with a synchronization mode of sync. The routine issues a read (or write) to a word with its full/empty bit set to empty (or full) with a synchronization mode of sync. A retry-limit exception will eventually be raised. The routine can then re-execute the read (or write) to continue delaying the issuance of instructions. The routine may also count the number of retry-limit exceptions to effectively control the length of the delay before continuing with the main work of the routine. In step 1701, the routine disables the data blocked trap so that the routine can handle the retry-limit exception. In step 1702, the routine reads the delay$ synchronization variable. The full/empty bit of this synchronization variable is initialize to empty and is never set to full. Thus, this read will eventually raise a retry-limit exception. In step 1703, if the retry-limit exception has been raised, then the routine continues at step 1704. Step 1703 may be unnecessary if the only way the read can complete is when the retry-limit exception is raised. In step 1704, the routine increments a counter that keeps track of the number of retry-limit exceptions that have been raised and clears the retry limit exception. In step 1705, if the counter equals a predefined limit, then the routine continues at step 1706, else routine loops to step 1702 to read the delay$ synchronization variable. In step 1706, the routine sets the counter to zero and enables the data blocked trap. In step 1707, the routine performs its processing that was delayed. For example, the listener daemon may check the team list to determine whether there any unblocked threads. The routine then loops to step 1701 to restart the delay in issuing instructions.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method in a computer for reducing the rate at which a program executes instructions by determining when the rate of execution should be reduced, and when it is determined that the rate of execution should be reduced executing an instruction to access data in memory, the data pointed to by a chain of forwarding words, so that subsequent instructions are not executed until a memory subsystem resolves the chain of forwarding words.

2. The method of claim 1 wherein the number of forwarding words in the chain is adjusted to effect a change in the rate at which the program executes instructions.

3. The method of claim 1 wherein the instruction is within a loop to effectively reduce the rate at which the loop is executed.

4. The method of claim 1 wherein the computer has a multithreaded processor.

5. The method of claim 1 wherein the computer starts execution of an instruction of another program during resolution of the chain of forwarding words.

6. The method of claim 5 wherein the computer has a processor that supports simultaneous execution of threads.

7. The method of claim 5 wherein the number of forwarding words in the chain affects the rate at which the program executes instructions.

8. The method of claim 7 wherein the rate of issuing instructions of the other program increases as a result of increasing the number of forwarding words in the chain.

9. A method in a computer system for reducing the rate at which a program executes instructions by determining when the rate of execution should be reduced, and when it is determined that the rate of execution should be reduced executing an operation to perform a synchronized access to a word of memory that will eventually fail so that the issuing of new instructions is deferred until after receiving notification of the failure.

10. The method of claim 9 including re-executing the operation a predetermined number of times to control the rate at which the program executes instructions.

11. The method of claim 9 wherein the failure of the operation is indicated by raising a retry-limit exception.

12. The method of claim 11 wherein the program disables a trapping of the retry-limit exception so that a thread that issued the operation can handle the exception.

13. A method in a computer system for decreasing a rate of issuing instructions of a program, the computer system supporting simultaneous execution of more than one program, each program having instructions, the method comprising:
- determining when the rate of execution should be decreased;
- when it is determined that the rate of execution should be decreased, issuing an instruction of the program whose rate of issued instructions is to be decreased, the instruction for accessing memory of the computer system wherein the accessing is for decreasing the rate of issued instructions for the program;
- while the memory is being accessed during execution of the issued instruction of the program, issuing an instruction of an other program; and
- when the access to the memory is complete, issuing another instruction of the program
- wherein the instruction for accessing memory accesses a chain of forwarding words so that access to memory is not complete until resolution of the chain of forwarding words.

14. The method of claim 13 wherein the rate of issuing instructions for the other program increases as a result of the decreased rate of issuing instructions of the program.

15. The method of claim 13 including repeating the issuance of the instruction for accessing memory to further decrease the rate of issuing instructions.

16. The method of claim 13 wherein a number of forwarding words in the chain is changed to affect the rate of issued instructions for the program.

17. The method of claim 13 wherein the program is part of an operating system.

18. A method in a computer system for decreasing a rate of issuing instructions of a program, the computer system supporting simultaneous execution of more than one program, each program having instructions, the method comprising:
- determining when the rate of execution should be decreased;
- when it is determined that the rate of execution should be decreased, issuing an instruction of the program whose rate of issued instructions is to be decreased, the instruction for accessing memory of the computer system wherein the accessing is for decreasing the rate of issued instructions for the program;
- while the memory is being accessed during execution of the issued instruction of the program, issuing an instruction of an other program; and
- when the access to the memory is complete, issuing another instruction of the program
- wherein the instruction is for synchronized access to a word of memory and the access to memory is not complete until the synchronized access is determined to have failed.

19. The method of claim 18 wherein the synchronized access fails when a number of attempts to access memory exceeds a limit.

20. The method of claim 18 wherein the synchronized access fails because a retry-limit is exceeded.

21. The method of claim 20 including disabling trapping of a retry-limit exception so that the program can handle the exception.

22. The method of claim 18 wherein the computer system is based on a multithreaded architecture.

23. The method of claim 18 including after the instruction completes, reissuing the instruction to further decrease the rate of issuing instructions of the program.

24. A computer system for decreasing a rate of issuing instructions of a program, the computer system supporting simultaneous execution of more than one program, comprising:
- means for determining when the rate of execution should be decreased;
- means for issuing an instruction of the program whose rate of issued instructions is to be decreased, the instruction including a memory operation so that another program can have its instructions issued at an increased rate during execution of the memory operation; and
- means for issuing instructions of another program while memory is being accessed during execution of the issued instruction of the program
- wherein the memory operation accesses a chain of forwarding words so that access to memory is not complete until resolution of the chain of forwarding words.

25. The computer system of claim 24 wherein issuing of other instructions of the program is deferred until access to memory is completed.

26. The computer system of claim 24 wherein a number of forwarding words in the chain is altered to affect the rate of issued instructions for the program.

27. The computer system of claim 24 wherein the program is part of an operating system.

28. A computer system for decreasing a rate of issuing instructions of a program, the computer system supporting simultaneous execution of more than one program, comprising:
- means for determining when the rate of execution should be decreased;
- means for issuing an instruction of the program whose rate of issued instructions is to be decreased, the instruction including a memory operation so that another program can have its instructions issued at an increased rate during execution of the memory operation; and
- means for issuing instructions of another program while memory is being accessed during execution of the issued instruction of the program
- wherein the memory operation is for synchronized access to a word of memory and the access to memory is not complete until the synchronized access is determined to have failed.

29. The computer system of claim 28 wherein the synchronized access fails when a number of attempts to access memory exceeds a limit.

30. The computer system of claim 28 wherein the synchronized access fails because a retry-limit is exceeded.

31. The computer system of claim 30 including disabling trapping of a retry-limit exception so that the program can handle the exception.

32. The computer system of claim 28 wherein the computer system has a multithreaded architecture.

33. The computer system of claim 28 including after the instruction completes, reissuing the instruction to further increase the rate of issuing instructions of the other program.

34. A computer-readable medium containing instructions for controlling a computer system to decrease a rate of issuing instructions of a program, by a method comprising:
- determining when the rate of execution should be decreased;

when it is determined that the rate of execution should be decreased, issuing an instruction of the program whose rate of issued instructions is to be decreased, the instruction for accessing memory of the computer system wherein the accessing is for the purpose of decreasing the rate of issued instructions for the program; and while the memory is being accessed during execution of the issued instruction of the program, issuing instructions for other programs to effect increasing the rate of issuing instructions of those other program wherein the instruction for accessing memory accesses a chain of forwarding words so that access to memory is not complete until resolution of the chain of forwarding words.

35. The computer-readable medium of claim 34 wherein the issuing of other instructions of the program is deferred until the access to memory is completed.

36. The computer-readable medium of claim 34 wherein a number of forwarding words in the chain is changed to affect the rate of issued instructions for the program.

37. The computer-readable medium of claim 34 wherein the program is part of an operating system.

38. A computer-readable medium containing instructions for controlling a computer system to decrease a rate of issuing instructions of a program, by a method comprising:
determining when the rate of execution should be decreased;
when it is determined that the rate of execution should be decreased, issuing an instruction of the program whose rate of issued instructions is to be decreased, the instruction for accessing memory of the computer system wherein the accessing is for the purpose of decreasing the rate of issued instructions for the program; and
while the memory is being accessed during execution of the issued instruction of the program, issuing instructions for other programs to effect increasing the rate of issuing instructions of those other program
wherein the instruction is for synchronized access to a word of memory and the access to memory is not complete until the synchronized access is determined to have failed.

39. The computer-readable medium of claim 38 wherein the synchronized access fails when a number of attempts to access memory exceeds a limit.

40. The computer-readable medium of claim 38 wherein the synchronized access fails because a retry-limit is exceeded.

41. The computer-readable medium of claim 40 including disabling trapping of a retry-limit exception so that the program can handle the exception.

42. The computer-readable medium of claim 38 wherein the computer system is based on a multithreaded architecture.

43. The computer-readable medium of claim 38 including after the instruction completes, reissuing the instruction to further decrease the rate of issuing instructions of the program.

44. A method in a computing system for implementing an interrupt-free operating system comprising:
checking for an occurrence of an event;
determining that the event will not occur frequently relative to the time it takes to process the event and that the rate of issuing instructions should be reduced;
when the determination is made, executing an instruction for accessing memory that will reduce the rate of issuing instructions; and
after executing the instruction, checking for the occurrence of the event
wherein the instruction for accessing memory accesses a chain of forwarding words so that access to memory is not complete until resolution of the chain of forwarding words.

45. The method of claim 44 wherein the number of forwarding words in the chain is altered to affect the rate of issued instructions for the program.

46. A method in a computing system for implementing an interrupt-free operating system comprising:
checking for an occurrence of an event;
determining that the event will not occur frequently relative to the time it takes to process the event and that the rate of issuing instructions should be reduced;
when the determination is made, executing an instruction for accessing memory that will reduce the rate of issuing instructions; and
after executing the instruction, checking for the occurrence of the event
wherein the instruction is for synchronized access to a word of memory and the access to memory does not complete until the synchronized access is determined to have failed.

47. The method of claim 46 wherein the synchronized access fails when a number of attempts to access memory exceeds a limit.

48. The method of claim 46 wherein the synchronized access fails because a retry-limit is exceeded.

49. The method of claim 48 further comprising executing an instruction to disable trapping of a retry-limit exception before executing the instruction for accessing memory.

* * * * *

UNITED STATES PATENT AND TRADEMARK OFFICE
CERTIFICATE OF CORRECTION

| | |
|---|---|
| PATENT NO. | : 7,020,767 B2 |
| APPLICATION NO. | : 09/792426 |
| DATED | : March 28, 2006 |
| INVENTOR(S) | : Gail A. Alverson et al. |

Page 1 of 1

It is certified that error appears in the above-identified patent and that said Letters Patent is hereby corrected as shown below:

Column 4
Line 9, "fill" should be --full--;

Column 10
Line 51, "Tearn" should be --Team--;

Signed and Sealed this

Twenty-fifth Day of July, 2006

JON W. DUDAS
*Director of the United States Patent and Trademark Office*